(12) United States Patent
Ohtake et al.

(10) Patent No.: US 9,367,300 B2
(45) Date of Patent: Jun. 14, 2016

(54) METHOD AND APPARATUS FOR DETERMINING INSTALLATION ORDER OF SOFTWARE

(71) Applicant: FUJITSU LIMITED, Kawasaki-shi, Kanagawa (JP)

(72) Inventors: Tomohiro Ohtake, Kawasaki (JP); Shinji Kikuchi, Yokohama (JP); Toshihiro Kodaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 14/270,492

(22) Filed: May 6, 2014

(65) Prior Publication Data

US 2014/0245279 A1    Aug. 28, 2014

Related U.S. Application Data

(63) Continuation of application No. PCT/JP2011/079410, filed on Dec. 19, 2011.

(51) Int. Cl.
*G06F 9/44* (2006.01)
*G06F 9/445* (2006.01)
*G06F 11/14* (2006.01)

(52) U.S. Cl.
CPC .. *G06F 8/65* (2013.01); *G06F 8/61* (2013.01); *G06F 9/445* (2013.01); *G06F 11/1433* (2013.01)

(58) Field of Classification Search
None
See application file for complete search history.

(56) References Cited

U.S. PATENT DOCUMENTS

| 5,805,898 | A * | 9/1998 | Barsness | G06F 8/61 713/2 |
| 5,960,206 | A * | 9/1999 | Barsness | G06F 8/61 713/1 |
| 6,202,121 | B1 * | 3/2001 | Walsh | G06F 3/0607 711/100 |
| 6,216,175 | B1 * | 4/2001 | Sliger | G06F 8/68 341/106 |
| 6,237,144 | B1 * | 5/2001 | Delo | G06F 8/61 707/999.003 |
| 6,240,550 | B1 * | 5/2001 | Nathan | G06F 8/65 717/163 |
| 6,327,706 | B1 * | 12/2001 | Amberg | G06F 8/63 702/123 |

(Continued)

FOREIGN PATENT DOCUMENTS

| JP | 2000-089809 | 3/2000 |
| JP | 2001-350988 | 12/2001 |

(Continued)

OTHER PUBLICATIONS

International Search Report, mailed in connection with PCT/JP2011/079410 and mailed Feb. 21, 2012.

*Primary Examiner* — Tuan Q. Dam
*Assistant Examiner* — Zheng Wei
(74) *Attorney, Agent, or Firm* — Fujitsu Patent Center

(57) ABSTRACT

A method of determining an installation order of multiple update programs corresponding to multiple pieces of software for updating current versions of the software on a computer to newer versions, includes applying a function outputting an index representing a degree of likelihood of existence of a version of software on the computer, to information about each piece of software existing on known computers, to calculate the index for each combination of the current and newer versions of the software; and searching for the installation order satisfying a predetermined condition based on a total of the indices corresponding to the combinations of the current and newer versions possibly realized when installing the update programs corresponding to the software one by one from a state of all the current versions to a state of all the new versions.

18 Claims, 19 Drawing Sheets

(56) References Cited

U.S. PATENT DOCUMENTS

| | | | | |
|---|---|---|---|---|
| 6,360,363 B1 * | 3/2002 | Moser | G06F 8/67 707/999.202 |
| 6,449,764 B1 * | 9/2002 | Sliger | G06F 8/68 341/51 |
| 6,681,391 B1 * | 1/2004 | Marino | G06F 8/61 711/133 |
| 7,174,540 B2 * | 2/2007 | Ondrusek | G06F 8/71 717/120 |
| 7,343,443 B1 * | 3/2008 | Yang | G06F 8/665 711/5 |
| 7,434,216 B1 * | 10/2008 | O'Neill | G06F 8/68 711/158 |
| 7,496,912 B2 * | 2/2009 | Keller | G06F 8/61 717/120 |
| 7,665,081 B1 * | 2/2010 | Pavlyushchik | G06F 8/68 707/770 |
| 7,739,679 B2 * | 6/2010 | Qumei | G06F 9/44521 717/170 |
| 7,861,241 B2 * | 12/2010 | Kumagai | G06F 8/65 717/168 |
| 8,291,402 B2 * | 10/2012 | Pazdziora | G06F 8/65 717/168 |
| 8,438,558 B1 * | 5/2013 | Adams | G06F 8/68 717/168 |
| 8,584,113 B2 * | 11/2013 | McCurdy | G06F 8/68 717/168 |
| 8,671,402 B2 * | 3/2014 | McCurdy | G06F 8/65 717/168 |
| 8,707,293 B2 * | 4/2014 | Festi | G06F 9/445 717/174 |
| 9,009,694 B2 * | 4/2015 | DiRico | G06F 8/65 717/168 |
| 9,141,375 B2 * | 9/2015 | Yang | G06F 8/68 |
| 2004/0015946 A1 * | 1/2004 | Te'eni | G06F 9/44552 717/169 |
| 2004/0181790 A1 * | 9/2004 | Herrick | G06F 8/60 717/168 |
| 2007/0288423 A1 | 12/2007 | Kimoto | |
| 2008/0148251 A1 * | 6/2008 | Yang | G06F 8/665 717/171 |
| 2010/0218176 A1 * | 8/2010 | Spanner | G06F 11/368 717/170 |
| 2011/0113417 A1 * | 5/2011 | McCurdy | G06F 8/65 717/170 |
| 2011/0113418 A1 * | 5/2011 | McCurdy | G06F 8/68 717/170 |
| 2011/0179406 A1 * | 7/2011 | Ohama | G06F 8/665 717/168 |
| 2012/0290584 A1 * | 11/2012 | De Bona | G06F 8/60 707/741 |

FOREIGN PATENT DOCUMENTS

| | | |
|---|---|---|
| JP | 2007-334471 | 12/2007 |
| JP | 2008-233973 | 10/2008 |
| JP | 2009-193218 | 8/2009 |

* cited by examiner

FIG.1

| MACHINE | SW A Ver. | SW B Ver. | SW C Ver. |
|---|---|---|---|
| 1 | 5 | 5.5 | 4.1 |
| 2 | 5 | 6.0 | 4.1 |
| 3 | 6 | 6.0 | 4.1 |
| 4 | 6 | 5.5 | 4.1 |
| 5 | 6 | 5.5 | 5.1 |
| 6 | 6 | 5.5 | 4.1 |
| 7 | 6 | 6.0 | 5.1 |
| 8 | 6 | 6.0 | 4.1 |
| 9 | 6 | 6.0 | 5.1 |
| 10 | 6 | 6.0 | 5.1 |

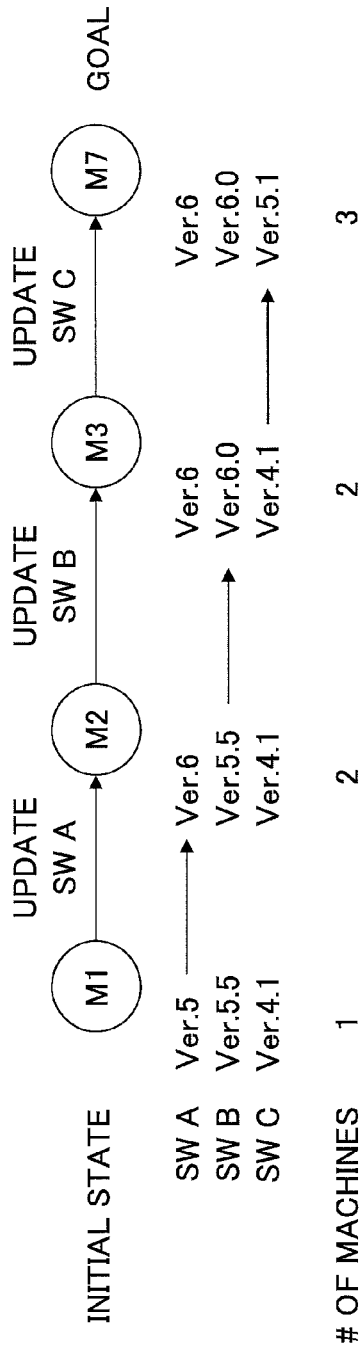
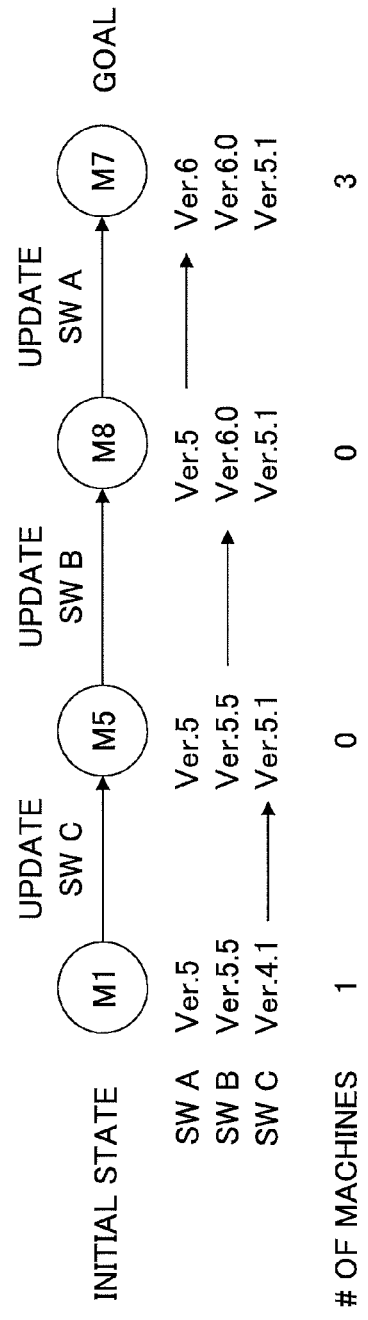

FIG.4

| MACHINE | SW A Ver. | SW B Ver. | SW C Ver. |
|---|---|---|---|
| 11 | 5 | 5.5 | 4.1 |
| 12 | 5 | 6.0 | 5.1 |
| 13 | 5 | 6.0 | 5.1 |
| 14 | 6 | 5.5 | 4.1 |
| 15 | 6 | 5.5 | 4.1 |
| 16 | 6 | 5.5 | 5.1 |
| 17 | 6 | 6.0 | 4.1 |
| 18 | 6 | 6.0 | 5.1 |
| 19 | 6 | 6.0 | 5.1 |
| 20 | 6 | 6.0 | 5.5 |

FIG.5

| SW | AVE. AMOUNT OF INFO (H) | Ver. | INFREQUEN-CY (I/H) |
|---|---|---|---|
| SW A | 0.265 | 5 | 1.97 |
| | | 6 | 0.583 |
| SW B | 0.292 | 5.5 | 1.36 |
| | | 6.0 | 0.759 |
| SW C | 0.410 | 4.1 | 0.971 |
| | | 5.1 | 0.735 |
| | | 5.5 | 2.44 |

FIG.6

| STATE | SW A | | SW B | | SW C | | TOTAL SW INFREQUENCY |
|---|---|---|---|---|---|---|---|
| | Ver. | I/H | Ver. | I/H | Ver. | I/H | |
| M1 | 5 | 1.97 | 5.5 | 1.36 | 4.1 | 0.971 | 1.97+1.36+0.971=4.3 |
| M2 | 6 | 0.583 | 5.5 | 1.36 | 4.1 | 0.971 | 0.583+1.36+0.971=2.9 |
| M3 | 6 | 0.583 | 6.0 | 0.759 | 4.1 | 0.971 | 0.583+0.759+0.971=2.3 |
| M4 | 5 | 1.97 | 6.0 | 0.759 | 4.1 | 0.971 | 1.97+0.759+0.971=3.7 |
| M5 | 5 | 1.97 | 5.5 | 1.36 | 5.1 | 0.735 | 1.97+1.36+0.735=4.1 |
| M6 | 6 | 0.583 | 5.5 | 1.36 | 5.1 | 0.735 | 0.583+1.36+0.735=2.7 |
| M7 | 6 | 0.583 | 6.0 | 0.759 | 5.1 | 0.735 | 0.583+0.759+0.735=2.1 |
| M8 | 5 | 1.97 | 6.0 | 0.759 | 5.1 | 0.735 | 1.97+0.759+0.735=3.5 |

FIG.7

| INSTALLATION ORDER | STATE TRANSITIONS | | | | TOTAL SW INFREQUENCY | |
|---|---|---|---|---|---|---|
| INSTALLATION ORDER 1 (A, C, B) | M1 | M2 | M6 | M7 | 4.3+2.9+2.7+2.1 = | 12.0 |
| INSTALLATION ORDER 2 (A, B, C) | M1 | M2 | M3 | M7 | 4.3+2.9+2.3+2.1 = | 11.6 |
| INSTALLATION ORDER 3 (C, A, B) | M1 | M5 | M6 | M7 | 4.3+4.1+2.4+2.1 = | 12.9 |
| INSTALLATION ORDER 4 (B, A, C) | M1 | M4 | M3 | M7 | 4.3+3.7+2.3+2.1 = | 12.4 |
| INSTALLATION ORDER 5 (C, B, A) | M1 | M5 | M8 | M7 | 4.3+4.1+3.5+2.1 = | 14.0 |
| INSTALLATION ORDER 6 (B, C, A) | M1 | M4 | M8 | M7 | 4.3+3.7+3.5+2.1 = | 13.6 |

FIG.12A

| MACHINE | SW D | SW E | SW F |
|---|---|---|---|
| 1 | 5 | 5.5 | 4.1 |
| 2 | 5 | 5.5 | 4.1 |
| 3 | 5 | 5.5 | 5.1 |
| 4 | 5 | 5.5 | 5.1 |
| 5 | 5 | 5.5 | 5.1 |
| 6 | 6 | 6.0 | 4.1 |
| 7 | 6 | 6.0 | 4.1 |
| 8 | 6 | 6.0 | 5.1 |
| 9 | 6 | 6.0 | 5.1 |
| 10 | 6 | 6.0 | 5.5 |

FIG.12B

| | SW E Ver. 5.5 | SW E Ver. 6.0 |
|---|---|---|
| SW D Ver. 5 | 5 | 0 |
| SW D Ver. 6 | 1 | 4 |

FIG.12C

| SW D Ver. 5 SW E Ver. 5.5 | 5 |
|---|---|
| SW D Ver. 6 SW E Ver. 6.0 | 4 |

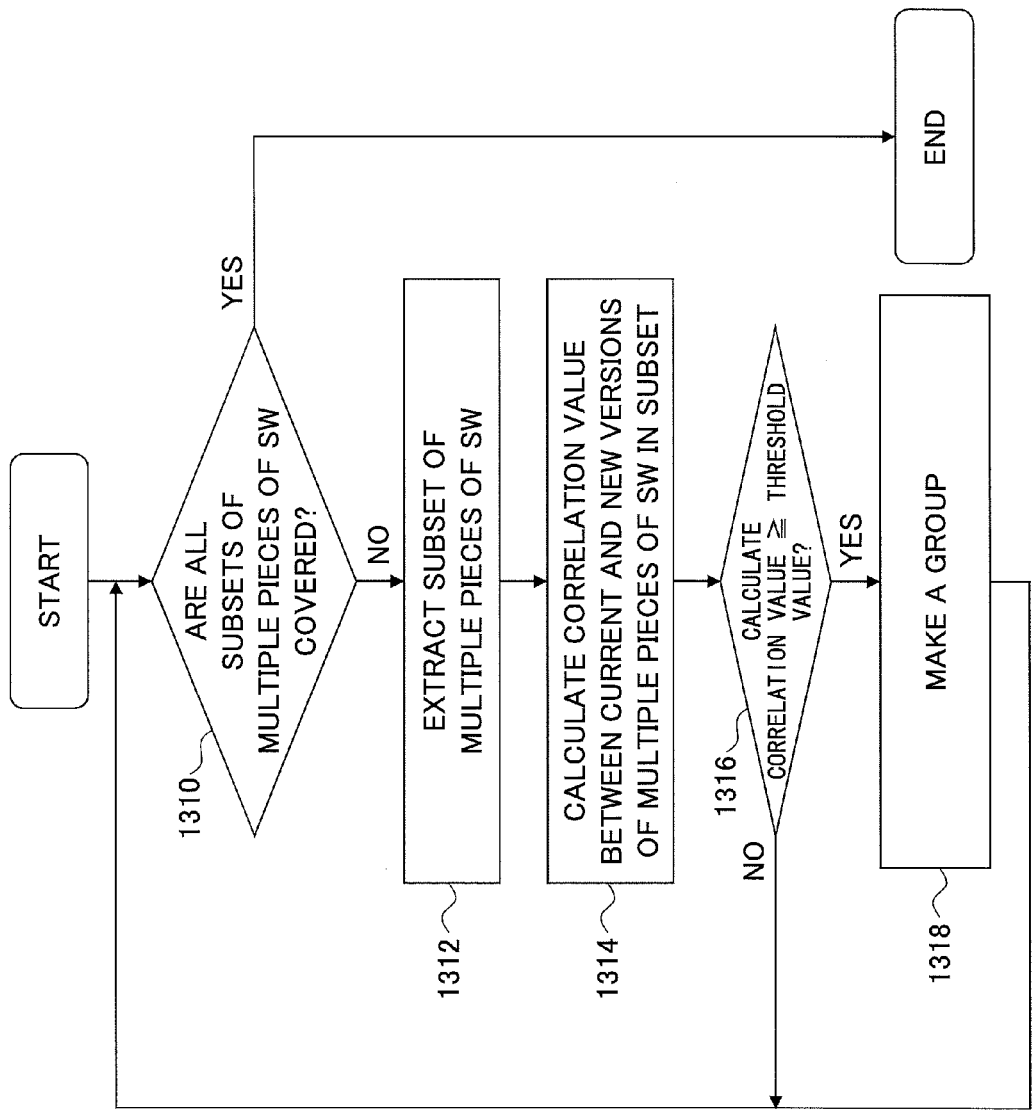

FIG.17

| STATE | SW P | SW Q | SW R | # OF INSTANCES (Xi) | INFREQUENCY (Ii/H) |
|---|---|---|---|---|---|
| M11 | 5 | 5.5 | 4.1 | 1 | 1.85 |
| M12 | 6 | 5.5 | 4.1 | 3 | 1.28 |
| M13 | 6 | 6.0 | 4.1 | 7 | 0.846 |
| M14 | 5 | 6.0 | 4.1 | 2 | 1.49 |
| M15 | 5 | 5.5 | 5.1 | 5 | 1.02 |
| M16 | 6 | 5.5 | 5.1 | 8 | 0.777 |
| M17 | 6 | 6.0 | 5.1 | 4 | 1.13 |
| M18 | 5 | 6.0 | 5.1 | 6 | 0.925 |

FIG.18

| INSTALLATION ORDER | STATE TRANSITIONS | | | | TOTAL SW INFREQUENCY |
|---|---|---|---|---|---|
| INSTALLATION ORDER 1 (P, R, Q) | M11 | M12 | M16 | M17 | 1.85+1.28+0.777+1.13 = 5.0 |
| INSTALLATION ORDER 2 (P, Q, R) | M11 | M12 | M13 | M17 | 1.85+1.28+0.846+1.13 = 5.1 |
| INSTALLATION ORDER 3 (R, P, Q) | M11 | M15 | M16 | M17 | 1.85+1.02+0.777+1.13 = 4.8 |
| INSTALLATION ORDER 4 (Q, P, R) | M11 | M14 | M13 | M17 | 1.85+1.49+0.846+1.13 = 5.3 |
| INSTALLATION ORDER 5 (R, Q, P) | M11 | M15 | M18 | M17 | 1.85+1.02+0.925+1.13 = 4.9 |
| INSTALLATION ORDER 6 (Q, R, P) | M11 | M14 | M18 | M17 | 1.85+1.49+0.925+1.13 = 5.4 |

METHOD AND APPARATUS FOR DETERMINING INSTALLATION ORDER OF SOFTWARE

CROSS-REFERENCE TO RELATED APPLICATIONS

This application is a continuation application of International Application PCT/JP2011/079410 filed on Dec. 19, 2011 and designated the U.S., the entire contents of which are incorporated herein by reference.

FIELD

The disclosures herein generally relate to the installation and update of software.

BACKGROUND

With development of office automation in recent years, various versions of multiple programs are installed on computers in companies. In addition, cloud computing has been developed. Therefore, it becomes very important to manage software installed on multiple machines, regardless of a physical machine or a virtual machine, for stable operations of the machines.

A number of pieces of software existing on the machines need to be updated regularly and on demand for security improvements and/or for functional upgrades.

Also, there are cases where various pieces of software use mutually common programs. Also, there are cases where compatibility issues exist among multiple pieces of software.

If the installation or update of pieces of software brings an incompatible combination of the pieces of software, there may be cases where the pieces of software exhibit unstable behavior or do not operate. Also, there may be cases where the pieces of software exhibit unstable behavior or do not operate due to an order of installation of the pieces of software including update programs.

For example, a package manager of software packages describes dependency relationships between pieces of software or the library. Such a package manager can identify, for example, software packages that cannot be installed or updated at the same time; hence, installation or update of these packages can be avoided.

However, the dependency relationships described in the package manager for the pieces of software are explicitly described by creators of the packages. Therefore, for example, dependency relationships or compatibility issues across multiple versions that are not recognized by the creators are not explicitly described.

Therefore, even if the package manager exists, update of multiple pieces of software may result in, for example, an incompatible combination of the pieces of software, which degrades performance or stops operation of a system.

In recent years, a considerable number of pieces of software exist on a physical machine or a virtual machine, and it is often the case that multiple update programs are installed in order when executing updates. In this case, depending on the order of the installation of the multiple update programs, the machine goes through a huge number of states. If different orders of installations are taken for the update programs, the machine goes through different paths of the installation states. In this case, if the order of the update programs is inappropriate, it is possible for the machine to fall into a very unstable state during the update. In this case, the machine may hang up in the unstable state, and the update of the series of pieces of software may not be continued any more.

If the update ends unsuccessfully during the course of the update of the series of pieces of software in this way, services of the machine stop. And it is often the case that a considerable amount of work has to be done for solving the failure.

Conventionally, there is a method of planning an execution order of jobs (processes) using a table that describes compatibility values among the jobs in a process management support system (see, for example, Patent Document 1). The method includes a grouping section to divide multiple jobs into groups based on job data for identifying jobs; an affinity representation table storage section to store an affinity representation table that includes numerical values to indicate degrees of affinity among a predetermined number of groups; an affinity comparison section to compare affinity among the groups in which the multiple jobs are included, based on the affinity representation table; and a process planning section to determine an execution order of the multiple jobs so that a job is followed by another job having a high degree of affinity with the preceding job based on the comparison result by the affinity comparison section.

However, a process handled in this process management support system is a process of physical jobs such as a color paint process, which are different from installation of pieces of software handled in the present invention. Also, this process management support system has an object to shorten change time between a process and its following process by examining compatibility between the two successive processes, which is fundamentally different from the present invention where an order is determined based on intermediate states during installation, an order in the past is taken into consideration, and a huge number of cases are enumerated that requires a different calculation method.

Also, a conventional technology exists that calculates stability of connections between parts including pieces of software (for example, Patent Document 2). The technology is used for proposing a combination of versions of software and hardware with which a highly stable configuration can be expected, for example, by considering compatibility between versions of the software and hardware in a storage system. The technology is not a technology for determining an installation order of pieces of software.

Also, a technology for checking hardware exists in which compatibility information of hardware components is taken into consideration (for example, Patent Document 3). This technology relates to the upgrade of a computer that can be ordered by a user with requests such as the upgrade or reproduction of a user's computer and the like, by searching for parts compatible with the model in a computer network where computers and mobile information terminals are connected, and determining whether the order is feasible. The technology is also not a technology for determining an installation order of pieces of software.

RELATED-ART DOCUMENTS

Patent Documents

[Patent Document 1] Japanese Laid-open Patent Publication No. 2000-089809
[Patent Document 2] Japanese Laid-open Patent Publication No. 2008-233973
[Patent Document 3] Japanese Laid-open Patent Publication No. 2001-350988

SUMMARY

According to at least one embodiment of the present invention, a computer-readable recording medium has a program stored therein for causing a computer to execute a method of determining an installation order of a plurality of update programs corresponding to a plurality of respective pieces of software, the installation being executed for updating current versions of the plurality of pieces of software to newer versions, respectively, the current versions having been installed on a computer to be updated. The method includes applying a function outputting an index representing a degree of likelihood of existence of a version of a piece of software on the computer, to information about each one of the pieces of software existing on a plurality of known computers, to calculate the index for each combination of the current versions and the new versions of the plurality of pieces of software; and searching for the installation order satisfying a predetermined condition based on a total of the indices corresponding to the combinations of the current versions and the new versions possibly realized when installing the update programs corresponding to the plurality of pieces of software one by one from a state of all the current versions to a state of all the new versions.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 1 is a schematic view illustrating versions of pieces of software that exist on multiple machines;

FIG. 3A-3B are schematic views illustrating state transitions obtained when installing update programs in order;

FIG. 4 is a schematic view illustrating versions of pieces of software that exist on multiple machines;

FIG. 5 is a schematic view illustrating infrequency associated with versions of multiple pieces of software;

FIG. 6 is a schematic view illustrating total infrequency of versions of pieces of software;

FIG. 7 is a schematic view illustrating total infrequency that can be taken by states of installation orders;

FIGS. 12A-12C are schematic views illustrating subsets of pieces of software that are highly correlated;

FIG. 13 is a flowchart for extracting subsets of pieces of software that are highly correlated;

FIG. 17 is a schematic view illustrating the number of instances and infrequency of pieces of software existing on a machine;

FIG. 18 is a schematic view illustrating total infrequency that can be taken by states of installation orders.

DESCRIPTION OF EMBODIMENTS

Figure 2A:
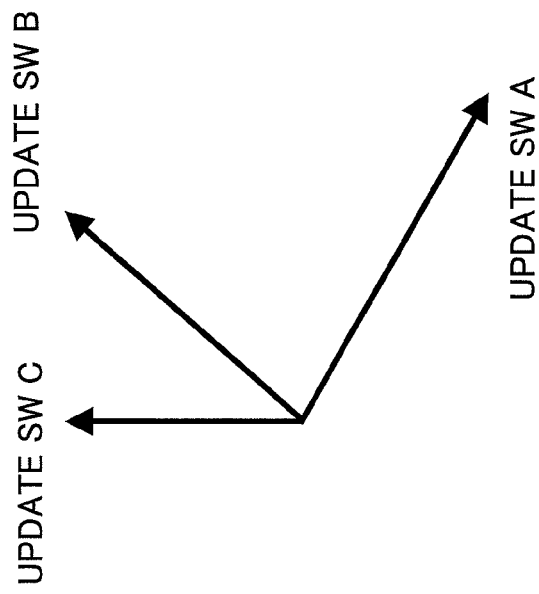
FIGS. 2A-2B are schematic views illustrating an installation order of pieces of software, using a hypercube.

In the following, embodiments of the present invention will be described with reference to the drawings. According to at least one embodiment of the present invention, a system can be secured for stability when installing multiple programs.

FIG. 1 illustrates versions of software A, B, and C existing (having installed) on multiple machines (physical machines or virtual machines). Software A has its versions 5 and 6 installed, software B has its versions 5.5 and 6.0 installed, and software C has its versions 4.1 and 5.1 installed.

In such circumstances, assume that an update is planned on a machine 1 where software A is to be upgraded from version 5 to 6, software B is to be upgraded from version 5.5 to 6.0, and software C is to be upgraded from version 4.1 to 5.1. Pieces of update software exist for each one of software A, B, and C. Therefore, multiple (in this case, six) orders exist for installing the three pieces of update software.

Figure 2B:
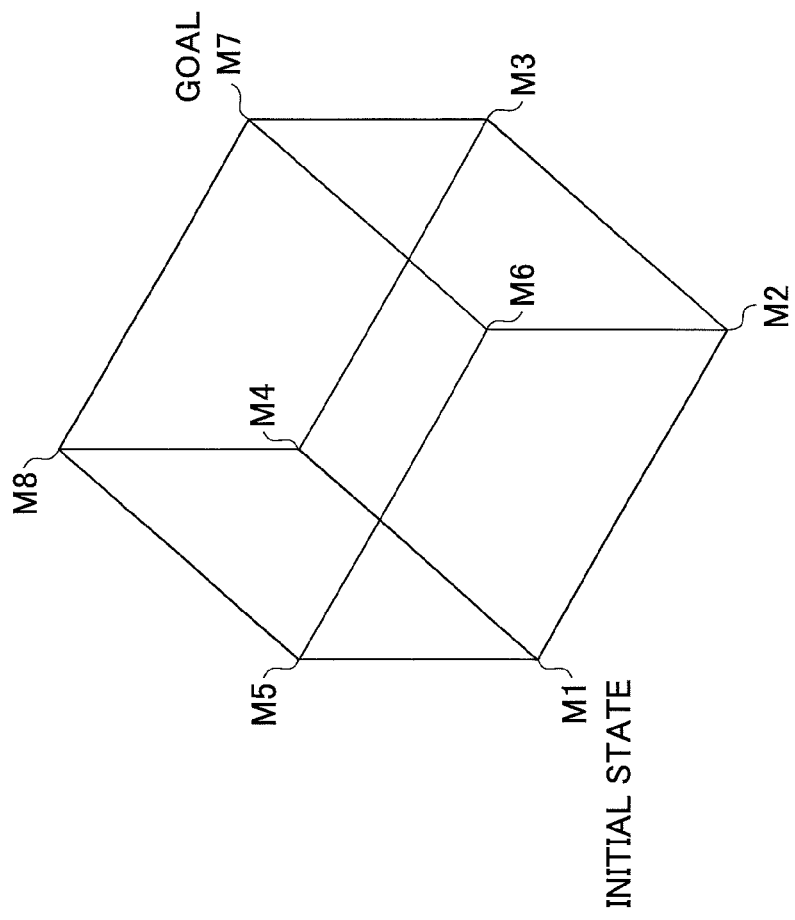

FIG. 2B illustrates states possibly realized during installation, using a hypercube. FIG. 2A illustrates operations of installing update programs of the three pieces of software, by directions of vectors. For example, a move from a state M1 to a state M2 represents update of software A. Namely, six paths exist starting from the initial state M1 to a goal M7.

When installing in order, the likelihood is high for a successful installation if a path to the goal is taken that is expected to be highly stable. On the other hand, the likelihood is high for an installation failure if a very unstable state is taken during the course of installation. Even if the installation is completed, the likelihood is high for resulting in an unstable machine state.

Stable operation of a system may be adequately expected if a combination of versions of multiple pieces of software has been materialized on a number of existing machines. This is because operation with the combination is empirically proven on the existing machines. On the other hand, a combination of versions of multiple pieces of software that seldom exists or does not exist at all on the existing machines is highly likely to result in unstable operation. This is because it is empirically inferred that such a combination is infrequent due to its instability or operational unfeasibility on the existing machines.

In general, it is difficult to predict stability of a machine after the installation before completing an installation of multiple pieces of software in order. However, it is possible to determine an order for the installation with which a more stable operation can be expected by taking the above thoughts into consideration.

In the following, an example is taken assuming the information in FIG. 1. FIG. 3A illustrates a state transition diagram in which pieces of update software relating to software A, B, and C are installed in an order of ABC. Numbers of machines (1, 2, 2, 3) in FIG. 3A represent the numbers of existing machines in FIG. 1 that correspond to the states (M1, M2, M3, M7), respectively. In this update order, it can be understood that every state has a combination of versions of software A, B, and C which exists on one or more of the existing machines.

FIG. 3B illustrates a state transition diagram in which the three software A, B, and C are updated in a different order. This case corresponds to the update order CBA of software A, B, and C. In this case, the numbers of existing machines are (1, 0, 0, 3) that correspond to the states (M1, M5, M8, M7), respectively. In this case, the state M5, namely, (software A version 5, software B version 5.5, software C version 5.1) does not exist on any of the existing machines in FIG. 1. Therefore, it is expected that the likelihood is very high that the state M5 is not a stable state. Similarly, a combination of versions of software A, B, and C of the state M8 does not exist on any of the existing machines in FIG. 1.

Comparing the example of the two installation orders described above, it can be expected that the update is executed more stably with the order in FIG. 3A, namely, the update programs for software A, B, and C is executed in the order of ABC, than in the order of CBA.

For the above example, the most stable installation order can be identified by comparing the total of six installation orders with each other.

EMBODIMENTS

Embodiment that Uses Infrequency of Individual Pieces of Software

In the example described above, the number of existing machines that have a specific combination of pieces of software is used for comparison. Note that the number of machines described above is just one type of index, and the present invention is not restricted to that.

In the following embodiment, infrequency is defined as an evaluation function as follow. Note that the present invention is not limited to this evaluation function. The infrequency $P_k$ is an index that indicates how infrequent a version k of software P exists on a computer, which is defined by the following formulas.

$$P_k = \frac{I_k}{H}$$

$$I_k = -\log_{10}\frac{x_k}{n}$$

$$H = -\sum_i \frac{x_i}{n}\log_{10}\frac{x_i}{n}$$

$$n = \sum_i x_i$$

where $x_i$ is the number of instances of a version i of software P (for example, $x_5=3$ and $x_6=7$ for software A in FIG. 4), and n is the number of samples of versions of software P, namely, a value that sums up the number of instances of a version i of software P for all possible values of i (for example, n=3+7=10 for software A in FIG. 4).

$I_k$ is called an "amount of information in selection", which is an amount of information representing that the version of a program P is k (for example, $I_k=-\log_{10}(x_5/n)=-\log_{10}(3/10)=0.53$ for version 5 of software A in FIG. 4). And H is the average amount of information (for example, $$H = -((x_5/n)\log_{10}(x_5/n) + (x_6/n)\log_{10}(x_6/n))$$

$$= -((3/10)\log_{10}(3/10) + (7/10)\log_{10}(7/10))$$

$$= 0.265$$

for software A in FIG. 4).

$P_k$ is defined by dividing the amount of information in selection $I_k$ by the average amount of information H because $I_k$, which may be considered as a weight (importance) of the information representing that the version of software P is k, may fluctuate greatly depending on individual software programs if not divided by H. Namely, the infrequency $P_k$ is calculated by dividing the amount of information in selection $I_k$ by the average amount of information H. The infrequency $P_k$ takes a greater value with less frequent existence of version k of software P.

Note that minus signs are attached to the amount of information in selection $I_k$ and the average amount of information H, to negate a negative calculation result of log, which is negative because $x_i/n$ is always less than 1. By attaching the minus sign, the amount of information in selection takes a positive value. Note that if $x_i=0$, the infrequency $P_k$ may be set to, for example, a predetermined great value because log by its definition goes to negative infinity when approaching to 0.

Note that although the base of 10 is adopted for log in the above example, another base may be adopted. Also, a function other than log may be used.

Also, although the infrequency is defined as an index that indicates how infrequent a version of a piece of software exists, this infrequency is just an example. Another index may be used for indicating the likelihood of existence of a version of a piece of software. For example, an index may be defined and used that takes a greater value with a higher likelihood of existence of a version of a piece of software. If using such an index, an installation order may be adopted that takes a greatest total of the indices.

FIG. 5 illustrates the infrequency for the versions of the pieces of software illustrated in FIG. 4, which are obtained as results of the above calculation.

FIG. 6 represents a table in which the infrequency of the versions of the pieces of software are summed up, corresponding to the states (M1 to M8) in FIG. 2B. By summing up the infrequency of the versions of the pieces of software in this way, the infrequency of each state (each combination of versions of multiple pieces of software) can be calculated approximately. Approximate infrequency of each state can be calculated by the method if the number of samples is small, especially. Note that if the number of samples is great, infrequency may be directly obtained for a combination of versions of multiple pieces of software (an example will be described in detail in later embodiments).

FIG. 7 illustrates a table in which total infrequency is exhaustively calculated for the installation orders illustrated by the hypercube in FIG. 2B, by summing up the infrequency of each of the states that has been transitioned in each of the installation orders. Among these, an installation order having the least total infrequency is installation order 2 of (A, B, C). Its total infrequency is 11.6. It can be understood that transitioned states are (M1, M2, M3, M7), and the installation order of the pieces of update software is A, B, and C. Namely, this installation order goes through not-the-least-infrequency states during the course of the installation.

Note that the installation order having the least total infrequency is determined by calculating the total infrequency for all installation orders in FIG. 7. As a method of determining a least value, however, a search algorithm known to ones skilled in the art, such as Dijkstra's algorithm, may be used for search of a path having the least value on the hypercube in FIG. 3B. Note that description is omitted for known search algorithms such as Dijkstra's algorithm.

Figure 8:
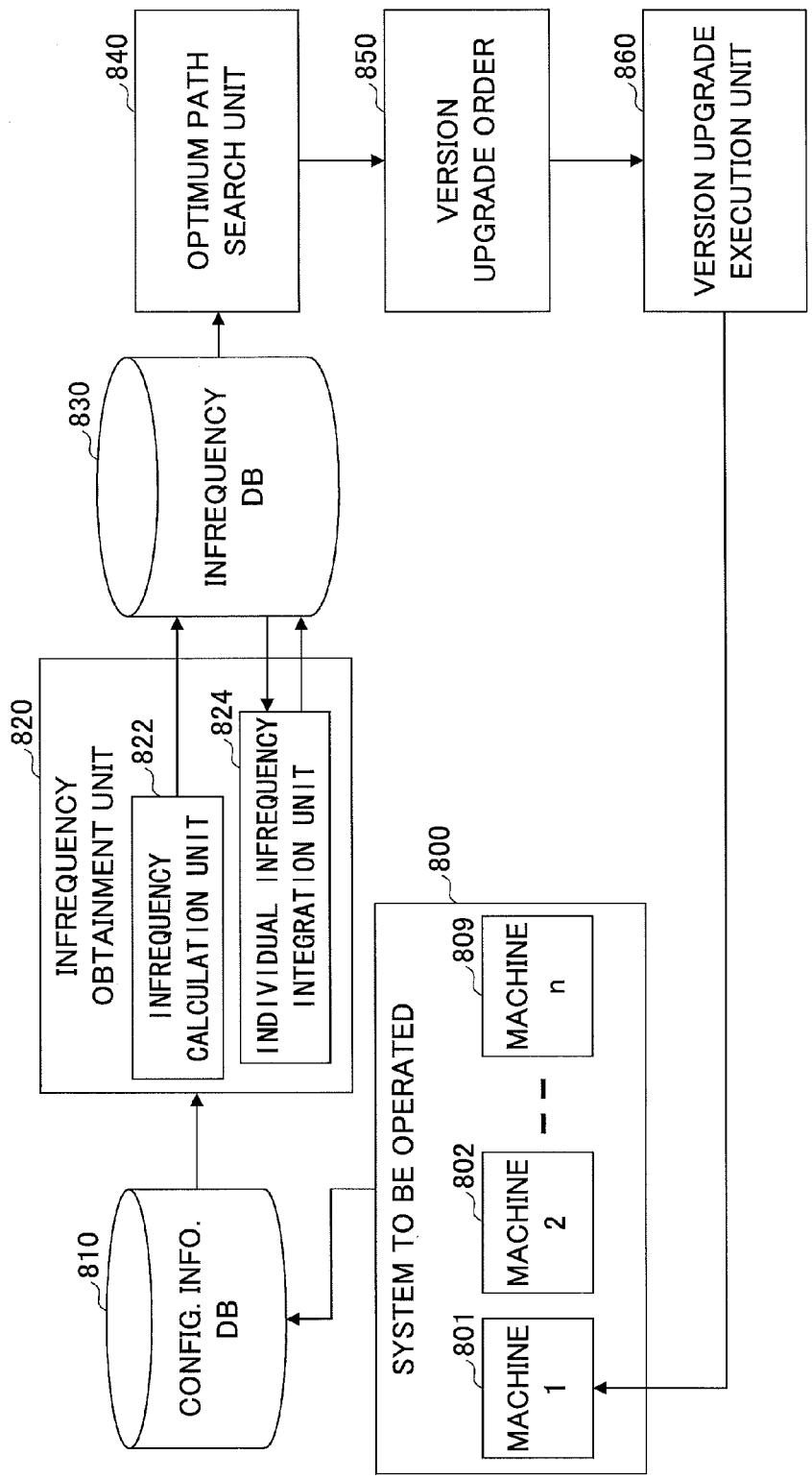
FIG. 8 is a schematic view illustrating a block diagram of an embodiment.

FIG. 8 illustrates a functional block diagram of the present embodiment. In the present embodiment, a version upgrade execution unit 860 executes a series of version upgrade as described above on a machine 1 (801) that is included in a system 800 to be operated, which is constituted with a group of the machine 1 (801), a machine 2 (802), . . . , and a machine n (809). Information about the machines 801-809 in the system 800 to be operated may be stored in a configuration information DB 810 beforehand. By referring to the configuration information DB 810, a infrequency obtainment unit 820 obtains information about versions of pieces of software that exist on the machines 801-809. A infrequency calculation unit 822 may calculate infrequency using the formulas described above. Calculated infrequency may be temporarily stored in a infrequency DB 830. The infrequency calculation unit 822 corresponds to an index calculation unit. The infrequency DB 830 may accumulate information for determining an order of update programs for later use. An individual infrequency integration unit 824 may calculate infrequency of a combination of versions of multiple pieces of software, by summing up each infrequency for each version of a piece of software. Note that an arithmetic operation other than a total may be used for the calculation. The individual infrequency integration unit 824 corresponds to an index integration unit. An integration result may be stored in the infrequency DB 830 again, or may be directly send to an optimum path search unit 840. The optimum path search unit 840 reads infrequency stored in the infrequency DB 830, creates a hypercube as illustrated in FIG. 2B, and determines a version upgrade order having the least total infrequency among version upgrade orders, by executing search using a path search method on the hypercube. Then, the optimum path search unit 840 outputs an optimum version upgrade order 850 with which stable operation can be expected. The version upgrade order 850 is output data, with which the version upgrade execution unit 860 executes a series of update for the pieces of software on the machine 1 to be maintained.

Figure 9:
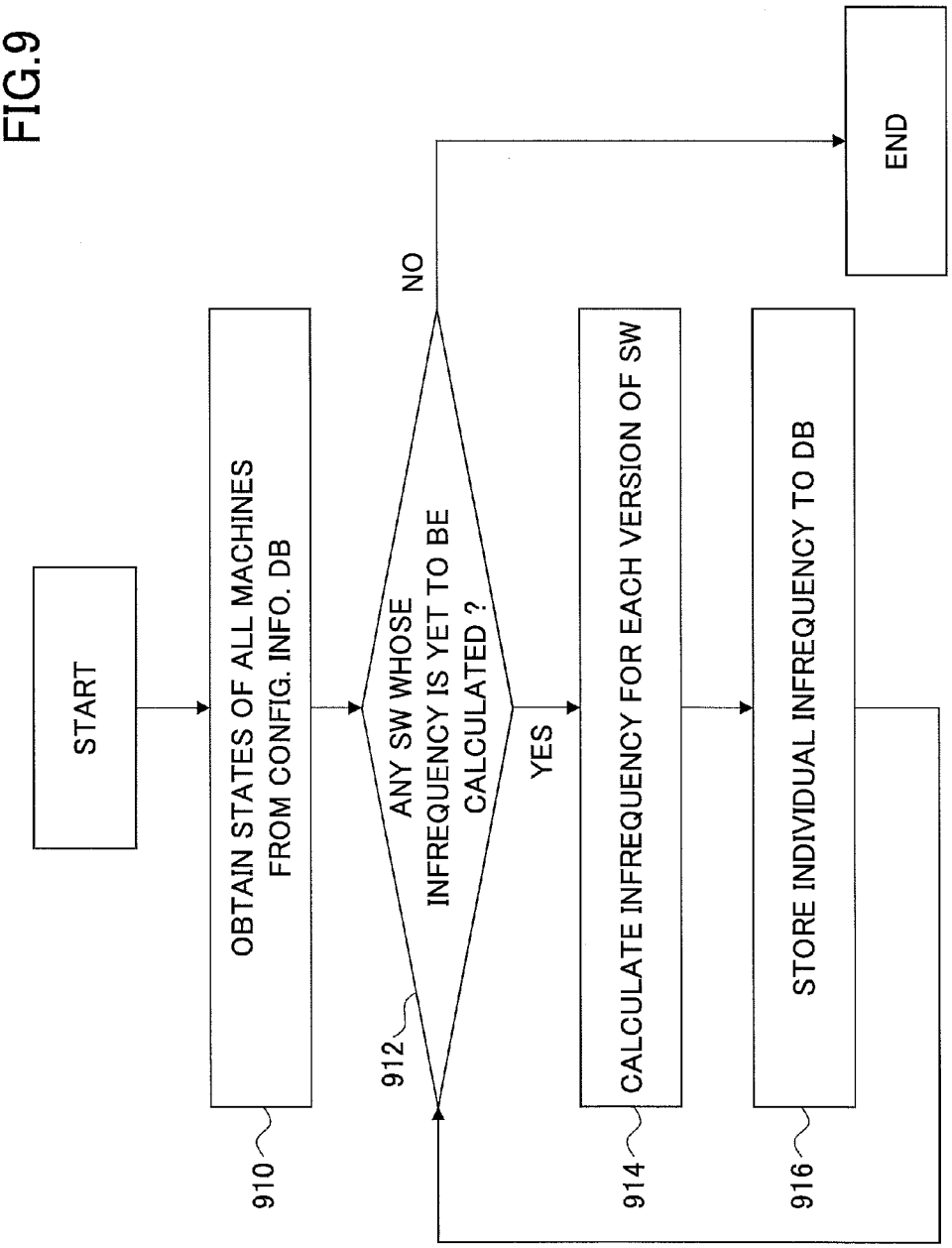
FIG. 9 is a flowchart for storing infrequency of each version of each pieces of software in DB.

FIG. 9 illustrates a flowchart for storing infrequency of each version of each of multiple pieces (for example, N pieces) of software in an individual infrequency DB.

At Step 910, states of all machines are obtained from the configuration information DB 810. Then, the process goes to Step 912.

At Step 912, it is determined whether there is any piece of software whose individual infrequency is yet to be calculated. If the individual infrequency has already been calculated for all pieces of software, the process ends. If there is any piece of software whose individual infrequency is yet to be calculated, the process goes to Step 914.

At Step 914, individual infrequency is calculated for each version of the piece of software. Then, the process goes to Step 916.

At Step 916, the individual infrequency is stored in the individual infrequency DB. Then, the process goes back to Step 912.

At Step 912, if the individual infrequency has already been calculated for all pieces of software, the process ends.

Figure 10:
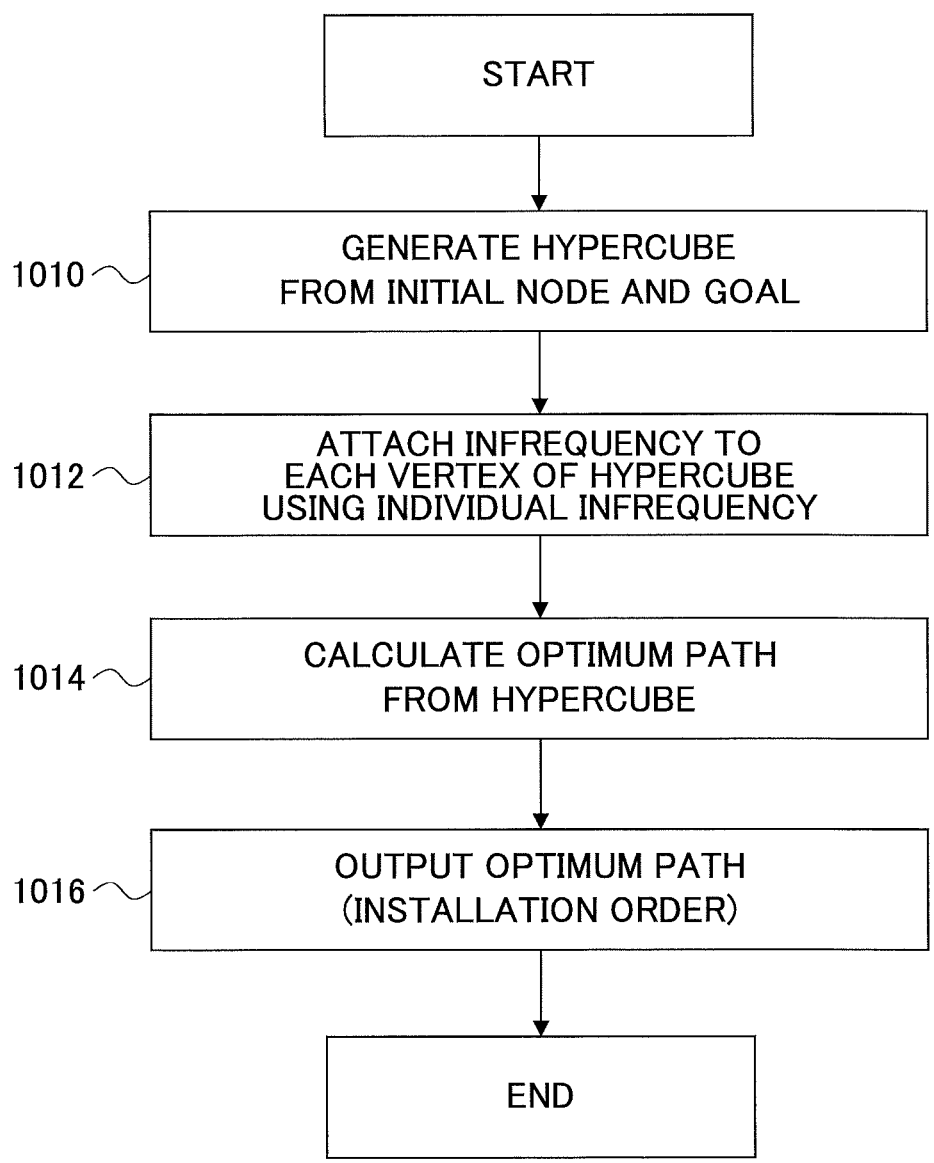
FIG. 10 is a flowchart for outputting an optimum installation order using infrequency.

FIG. 10 illustrates a flowchart for outputting an optimum installation order from calculated infrequency.

At Step 1010, a hypercube is generated as illustrated in FIG. 2B (the number of variations of paths from an initial node and a goal in the hypercube is the factorial of N). Then, the process goes to Step 1012.

At Step 1012, infrequency is attached to each vertex of the hypercube using the individual infrequency DB. Calculation of the infrequency uses the method described with using FIG. 6. The calculation method may sum up infrequency of the versions of the pieces of software. Or, an alternative calculation method may be used. Then, the process goes to Step 1014.

At Step 1014, an optimum path is calculated from the hypercube. The optimum path is obtained as a path having a least total infrequency of the vertices. The exhaustive method illustrated in FIG. 7 may be used as a method for obtaining the optimum path. Alternatively, a search algorithm such as Dijkstra's algorithm may be used. Then, the process goes to Step 1016.

At Step 1016, based on the obtained the optimum path, the optimum installation order of update programs is output.

Figure 11:
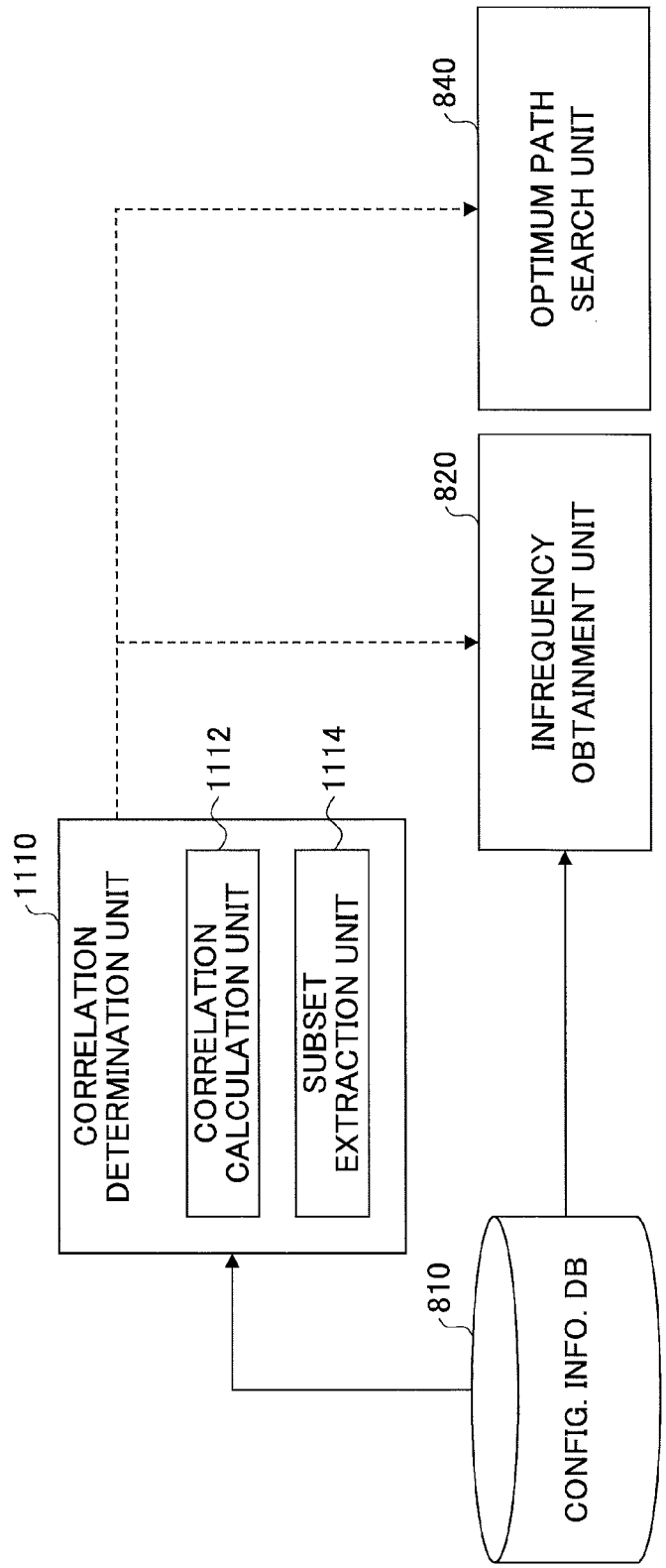
FIG. 11 is a schematic view illustrating a block diagram for extracting correlated pieces of software according to an embodiment.

FIG. 11 illustrates a block diagram for extracting correlated pieces of software with respect to versions. A correlation determination unit 1110 has a function that extracts multiple pieces of highly correlated software with respect to versions from information about the versions of the pieces of software stored in the configuration information DB 810. The correlation determination unit 1110 is provided with a correlation calculation unit 1112 that calculates correlation values for the multiple pieces of software. A subset extraction unit 1114 generates a subset of the pieces of software that is constituted with the multiple pieces of highly correlated software. Then, the subset may be treated as a single piece of software at the infrequency obtainment unit 820 and/or the optimum path search unit 840. By grouping multiple pieces of software into a subset to be treated as a single pieces of software, calculation of infrequency and path search can be simplified. Note that an installation order of pieces of update software that correspond to the pieces of software included in the subset may be arranged in a consecutive order. Alternatively, the installation may be executed in an order specified in advance. Instead, the installation order may be determined by recursively applying the installation order determination method in the present embodiment to the pieces of software included in the subset. Also, predetermined multiple pieces of software may be specified beforehand to be grouped as a subset.

FIGS. 12A-12C illustrate subsets of pieces of software that are highly correlated with respect to versions. FIG. 12A illustrates versions of software D, E, and F that exist on machines 1 to 10.

FIG. 12B illustrates the number of instances of versions of software D and E. As can be seen from FIG. 12B, major combinations of versions are a combination of an old version (5) of software D and an old version (5.5) of software E; and a combination of a new version (6) of software D and a version (6.0) of software E. This means that software D and E have a high correlation with respect to the versions. If a correlation coefficient is positive with respect to new and old versions, and the correlation coefficient is greater than a predetermined threshold value, multiple pieces of software may be grouped, for example, as illustrated in FIG. 12C. By being grouped in this way, the multiple pieces of software may be treated as a single piece of software.

For the case of FIG. 12C, infrequency may be calculated, for example, as follows.

$$n = 5 + 4 = 9$$

$$H = -\frac{5}{n}\log_{10}\frac{5}{n} - \frac{4}{n}\log_{10}\frac{4}{n} = 0.298$$

$$\frac{I_{(D5,E5.5)}}{H} = \frac{0.225}{0.298} = 0.856$$

$$\frac{I_{(D6,E6.0)}}{H} = \frac{0.352}{0.298} = 1.18$$

Note that $I_{(D5,\ E5.5)}$ means the amount of information in selection for a pair of version 5 of software D and version 5.5 of software E. This notation is also used for formulas below.

FIG. 13 illustrates a flowchart for extracting subsets of pieces of software that are highly correlated with respect to the versions.

At Step 1310, it is determined whether all subsets of multiple pieces of software have been covered. If all subsets have not been covered, the process goes forward to Step 1312.

At Step 1312, one of the subsets of the multiple pieces of software is newly extracted. Then, the process goes forward to Step 1314.

At Step 1314, a correlation value is calculated with respect to current and new versions of the multiple pieces of software in the subset. Then, the process goes forward to Step 1316.

At Step 1316, it is determined whether the correlation value is greater than or equal to a predetermined threshold value. If the correlation value is greater than or equal to the predetermined threshold value, the process goes forward to Step 1318. If the correlation value is less than the predetermined threshold value, the process goes back to Step 1310.

At Step 1318, a group is formed with the pieces of software in the subset. Then, the process goes back to Step 1310.

At Step 1310, if all subsets of multiple pieces of software have been covered, the process ends.

Figure 14:
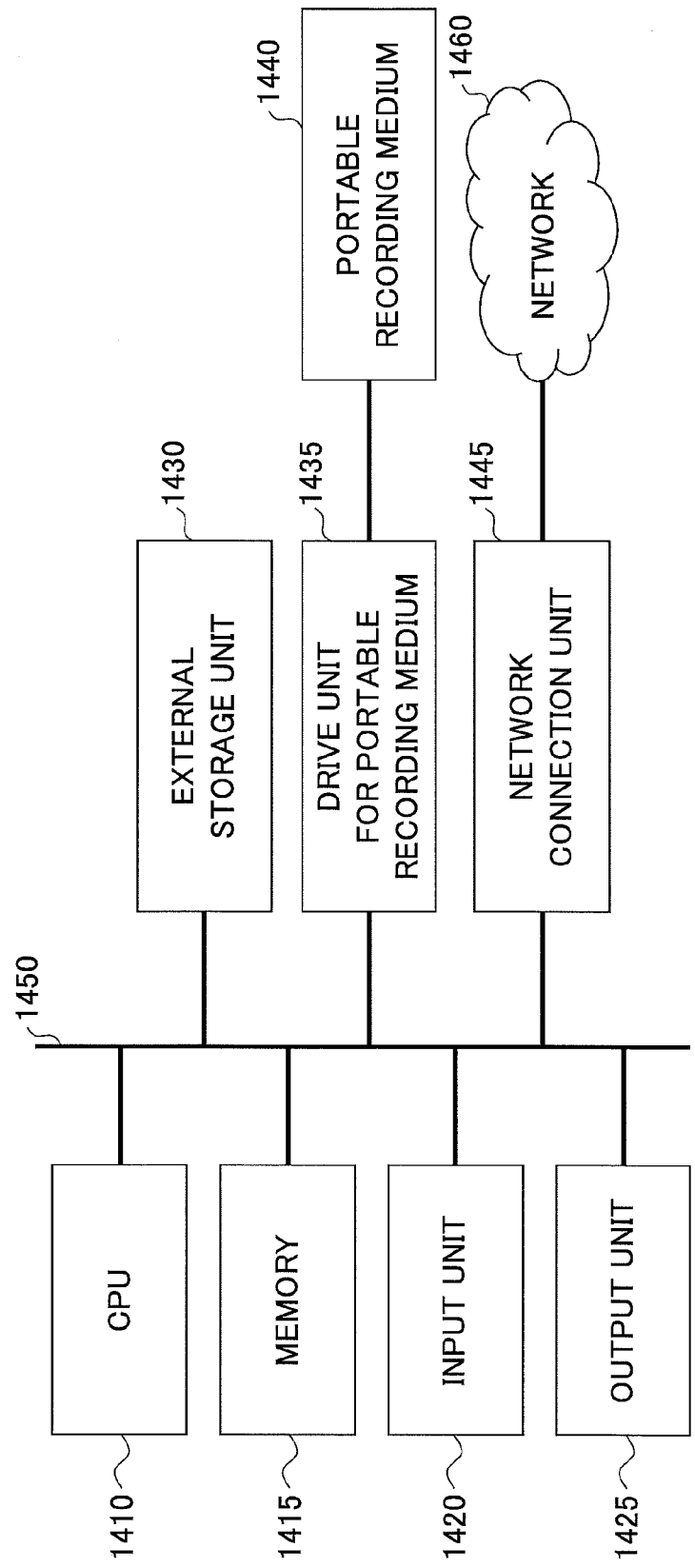
FIG. 14 is a schematic view illustrating a hardware configuration according to an embodiment.

FIG. 14 illustrates a hardware configuration of each of the machines in the system 800 and a management server (not illustrated). Each of the machines in the system 800 and the management server includes a CPU 1410, a memory 1415, an input unit 1420, an output unit 1425, an external storage unit 1430, a drive unit for a portable recording medium 1435, and a network connection unit 1445. These units are connected with each other by a bus 1450. Also, the portable recording medium drive device 1435 can read and write a portable recording medium 1440. And the network connection unit 1445 is connected with a network 1460. It may be connected with other machines via the network 1460. Also, the network 1460 may be connected with an external network such as the Internet.

The program in the present embodiment can be stored in the portable recording medium 1440. The portable recording medium 1440 is one or more non-transitory, tangible storage media having a structure. For example, the portable recording medium 1440 may be a magnetic storage medium, an optical disk, an optical-magnetic storage medium, a non-volatile memory, or the like. A magnetic storage medium may be an HDD, a flexible disk (FD), a magnetic tape (MT), or the like. An optical disk may be a DVD (Digital Versatile Disc), a DVD-RAM, a CD-ROM (Compact Disc-Read Only Memory), a CD-R (Recordable)/RW (ReWritable), or the like. Also, an optical-magnetic storage medium may be an MO (Magneto-Optical disk), or the like.

Embodiment that Uses Infrequency of a Combination of Multiple Pieces of Software In the embodiment described above, infrequency is calculated for individual versions of pieces of software. The embodiment described above is an effective method when the number of samples is small. Note that if the number of samples is ample, an embodiment described below may be used. Namely, the embodiment will be described in the following in which a process proceeds with directly calculating infrequency of a combination of versions of multiple pieces of software in states.

Figure 15:
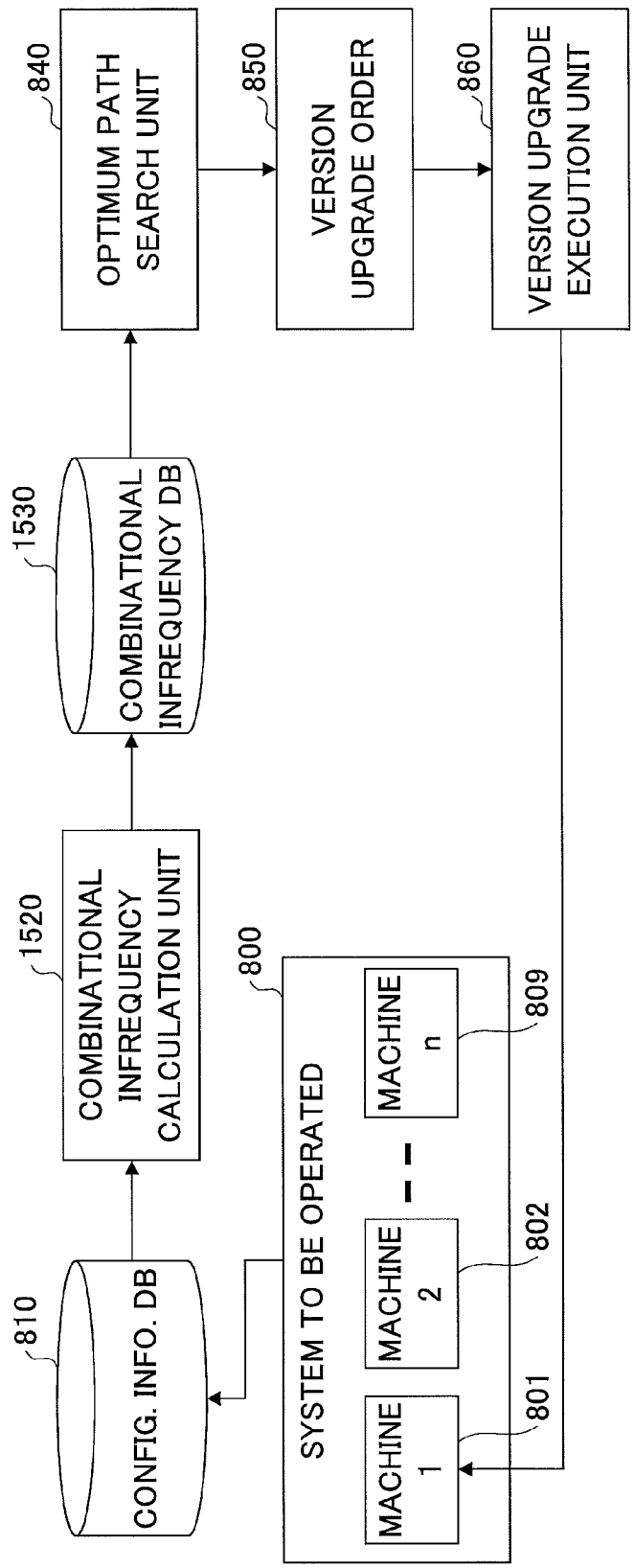
FIG. 15 is a schematic view illustrating an embodiment that handles infrequency of combinations of multiple pieces of software.

FIG. 15 is a functional block diagram that calculates infrequency of a combination of versions of multiple pieces of software. The configuration is similar to that in FIG. 8, and the systems in FIGS. 8 and 15 may be integrated and configured as one system. Parts that differ from those in FIG. 8 will be described below.

A combinational infrequency calculation unit 1520 calculates infrequency relating to a combination of versions of multiple pieces of software from the configuration information DB 810. The combinational infrequency calculation unit 1520 corresponds to a combinational index calculation unit. Details of the calculation will be described later. Then, calculated combinational infrequency is stored in a combinational infrequency DB 1530.

The rest of the process is substantially the same as in FIG. 8, and its description is omitted.

Figure 16:
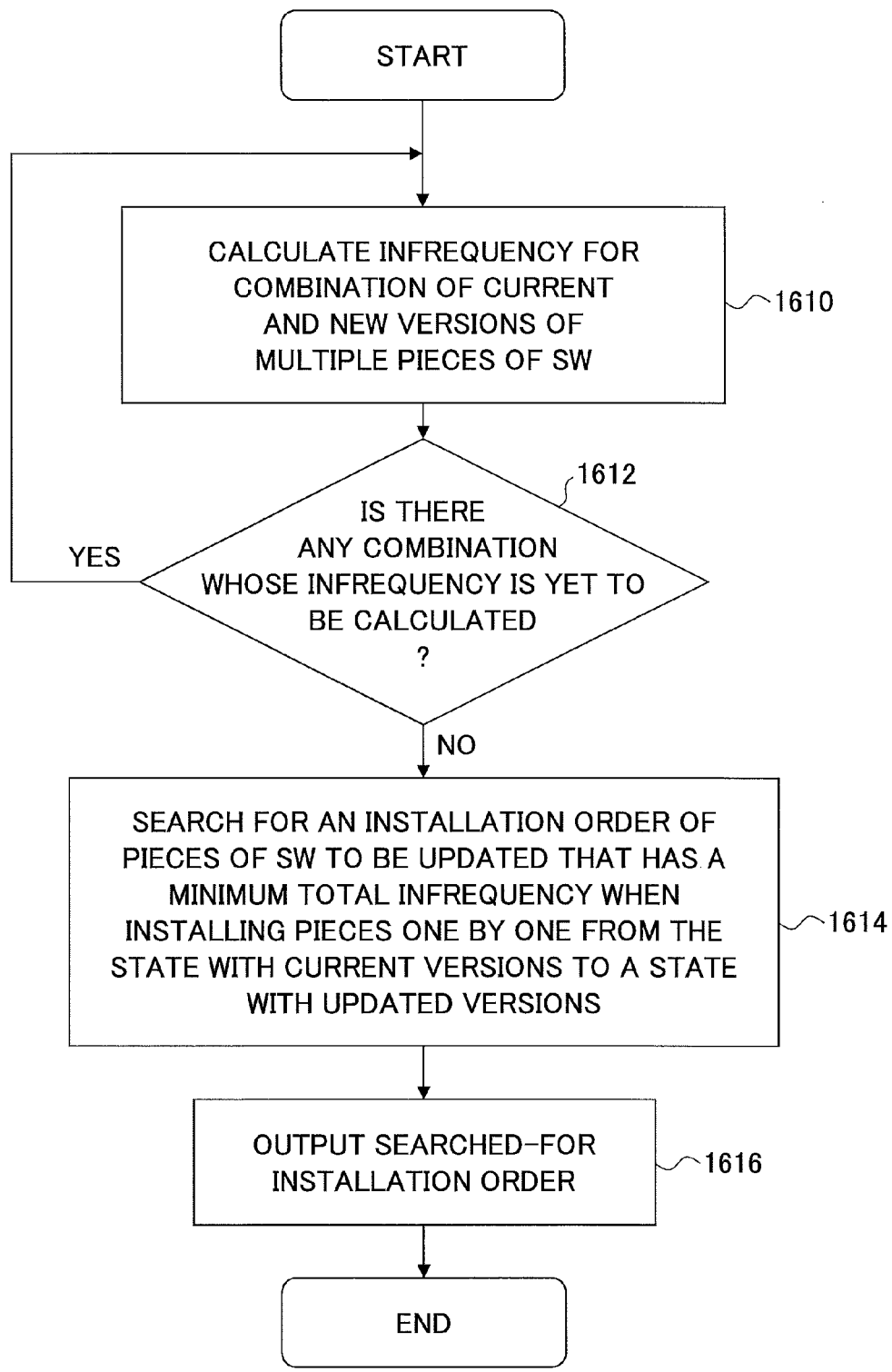
FIG. 16 is a flowchart for a method according to an embodiment.

FIG. 16 is a flowchart of the method in the present embodiment. First, at Step 1610, infrequency is calculated for a combination of current and new versions of multiple pieces (for example, N pieces) of software (the number of combination is the factorial of N). Note that the infrequency calculated at Step 1610 may be accumulated in the combinational infrequency DB 1630.

Then, at Step 1612, it is determined whether there is a combination whose infrequency is yet to be calculated. If the determination result is "YES", the process goes back to Step 1610. If the determination result is "NO", the process goes to Step 1614.

At Step 1614, a search is executed for an installation order of pieces of update software that has a least total infrequency when installing the pieces one by one from a state with all current versions to a state with all updated versions.

At Step 1616, an installation order found by the search is output.

FIG. 17 illustrates versions of software P, Q, and R that exist on existing multiple machines, and the number of instances and infrequency for each combination of versions, which are accumulated in the configuration information DB 810. For example, a state M12 in FIG. 17 will be described below. In the state M12, it can be understood that the versions of software P, Q, and R are 6, 5.5, and 4.1, respectively, and the configuration information DB 810 stores the number of machines existing with this configuration, which is three. The infrequency of the state M12 is calculated as follows.

$$n = \sum_i x_i = 1 + 3 + 7 + 2 + 5 + 8 + 4 + 6 = 36$$

$$H = -\sum_i \frac{x_i}{n} \log_{10} \frac{x_i}{n} = -\left(\frac{1}{36}\log_{10}\frac{1}{36}\right) - \left(\frac{3}{36}\log_{10}\frac{3}{36}\right) -$$

$$\left(\frac{7}{36}\log_{10}\frac{7}{36}\right) - \left(\frac{2}{36}\log_{10}\frac{2}{36}\right) - \left(\frac{5}{36}\log_{10}\frac{5}{36}\right) -$$

$$\left(\frac{8}{36}\log_{10}\frac{8}{36}\right) - \left(\frac{4}{36}\log_{10}\frac{4}{36}\right) - \left(\frac{6}{36}\log_{10}\frac{6}{36}\right) = 0.841$$

$$I_{(P6,Q5.5,R4.1)} = -\log_{10}\frac{x_{(P6,Q5.5,R4.1)}}{n} = -\log_{10}\frac{3}{36} = 1.08$$

$$P_{(P6,Q5.5,R4.1)} = \frac{I_{(P6,Q5.5,R4.1)}}{H} = \frac{1.08}{0.841} = 1.28$$

Infrequency of the other states can be calculated in the same way. Note that k's as in $I_k$, xk, and $P_k$ are represented in a vector format, for example, (P6, Q5.5, R4.1) as described above.

FIG. 18 illustrates total infrequency values exhaustively calculated based on state transitions in installation orders. The least total infrequency is 4.8 for an installation order 3 of (R, P, Q). Therefore, it can be understood that the optimum installation order is R, P, and Q for the update software programs of P, Q and R.

Figure 19B:
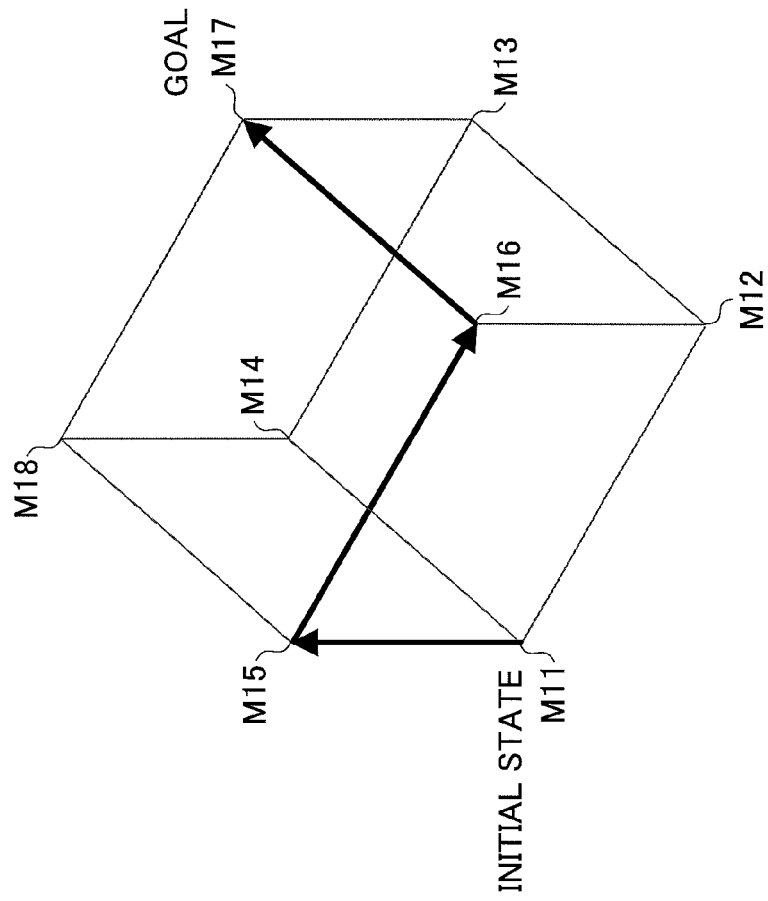
FIGS. 19A-19B are schematic views illustrating an example of search for an optimum path using a hypercube.
Figure 19A:
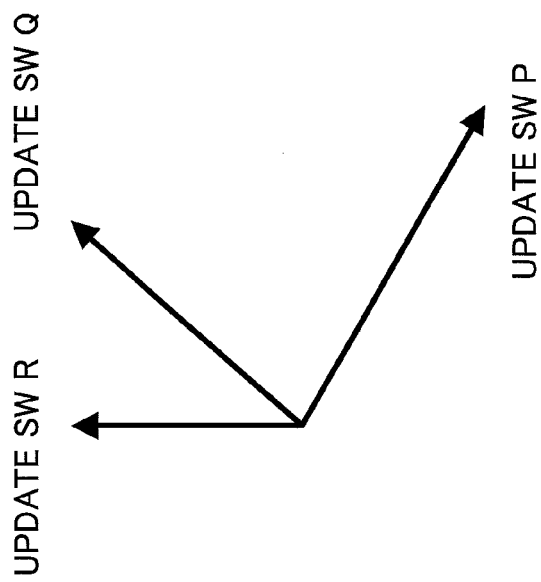

FIG. 19A is similar to FIG. 2A where ABC is replaced with PQR, which illustrates operations of installing update programs by directions of vectors. FIG. 19B represents the respective states by a hypercube in which a path along arrows is an optimum path that indicates the installation order of R,P, and Q as described above. Note that although a least value is obtained by exhaustive calculation in FIG. 18, the optimum path can be found faster by executing a search with a path search algorithm such as Dijkstra's algorithm on the hypercube in FIG. 19B.

Note that although a 3D hypercube is illustrated as an example in the above embodiment, path search may be executed on a hypercube beyond 3D if the number of pieces of software to be updated is over three. In the present embodiment, an example beyond 3D is not taken up because it is difficult to illustrate it schematically. However, it is obvious for ones skilled in the art to be able to understand a process for a case beyond 3D. It is also obvious that a search algorithm such as Dijkstra's algorithm is more advantageous with a greater dimension.

Note that the present specification is mainly described with the embodiments that update pieces of software. It should be understood that concepts of an update and an update program used in the present specification have broad meanings. For example, it is obvious that installation of a new piece of software may be included as an update, or an execution of an update program, in the embodiments of the present invention. Using one of the methods of determining an installation order disclosed in the above embodiments, installation order of multiple pieces of software may be determined including pieces of software that are to be newly installed.

Also, configurations disclosed in the respective embodiments are not mutually exclusive. Therefore, any elements in the configurations in the multiple embodiments can be combined unless any contradictions arise.

In addition, steps of the methods and programs described in the embodiments may be executed in a different order of the steps unless any contradictions arise. It is also obvious that different orders of steps of the methods and programs described in attached claims are within the technological scope of the claims.

It should be noted that the embodiments have been described as above for exemplifying the present invention, not for limiting the range of the embodiments of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a first computer to execute a process of determining an installation order in which a plurality of update programs corresponding to a plurality of pieces of software are to be installed in the first computer to update current versions of the plurality of pieces of software to updated versions, the process comprising:
applying a function outputting an index representing a degree of likelihood that a version of a piece of software is installed in the first computer, to information related to a plurality of pieces of software installed in a plurality of known second computers, to calculate the index for each combination of current versions and updated versions of the plurality of pieces of software; and
searching for the installation order satisfying a predetermined condition based on a total of the indices corresponding to possible combinations of the current versions and the updated versions when installing a plurality of update programs corresponding to the plurality of pieces of software one by one from a state in which versions of all of the plurality of pieces of software are the current versions to a state in which the versions of all of the plurality of pieces of software are the updated versions.

2. The non-transitory computer-readable recording medium as claimed in claim 1, wherein the applying includes
obtaining the index by applying the function to each of the versions for each of the plurality of pieces of software, and
calculating the index for each of the combinations by integrating the indices corresponding to the respective versions of the plurality of pieces of software included in the combination.

3. The non-transitory computer-readable recording medium as claimed in claim 1, wherein the applying calculates the index for each of the combinations by applying the function to the combination.

4. The non-transitory computer-readable recording medium as claimed in claim 1, wherein the function outputs an index $P_k$, which is a scalar value, for each of possible values of k, which is an N-dimensional vector of versions of N pieces of software, where N≥1, the index $P_k$ is calculated by formulas $$P_k = \frac{I_k}{H}$$

$$I_k = -\log_{10}\frac{x_k}{n}$$

$$H = -\sum_i \frac{x_i}{n}\log_{10}\frac{x_i}{n}$$

$$n = \sum_i x_i$$

where $x_i$ is a number of instances of versions i, which is an N-dimensional vector, of the N pieces of software, and
wherein the predetermined condition is that the total takes a least value.

5. The non-transitory computer-readable recording medium as claimed in claim 1, wherein the process further comprises:
calculating a correlation value between the current versions and the updated versions of the plurality of pieces of software included in a subset having two or more pieces of software amongst the plurality of pieces of software;
extracting the subsets having the correlation values greater than a predetermined threshold value; and
grouping the pieces of software included in one of the extracted subsets into a group to be treated as a single piece of software.

6. The non-transitory computer-readable recording medium as claimed in claim 1, wherein the process further comprises:
- calculating a correlation value between the current versions and the updated versions of the plurality of pieces of software included in a subset having two or more pieces of software amongst the plurality of pieces of software;
- extracting the subsets having the correlation values greater than a predetermined threshold value; and
- processing the pieces of software included in one of the extracted subsets.

7. A method of determining an installation order in which a plurality of update programs corresponding to a plurality of pieces of software are to be installed in a first computer to update current versions of the plurality of pieces of software to updated versions, the method comprising:
- applying, by the first computer, a function outputting an index representing a degree of likelihood that a version of a piece of software is installed in the first computer, to information related to a plurality of pieces of software installed in a plurality of known second computers, to calculate the index for each combination of current versions and updated versions of the plurality of pieces of software; and
- searching, by the first computer, the installation order satisfying a predetermined condition based on a total of the indices corresponding to possible combinations of the current versions and the updated versions when installing a plurality of update programs corresponding to the plurality of pieces of software one by one from a state in which versions of all of the plurality of pieces of software are the current versions to a state in which the versions of all of the plurality of pieces of software are the updated versions.

8. The method as claimed in claim 7, wherein the applying includes
- obtaining the index by applying the function to each of the versions for each of the plurality of pieces of software, and
- calculating the index for each of the combinations by integrating the indices corresponding to the respective versions of the plurality of pieces of software included in the combination.

9. The method as claimed in claim 7, wherein the applying calculates the index for each of the combinations by applying the function to the combination.

10. The method as claimed in claim 7, wherein the function outputs an index $P_k$, which is a scalar value, for each of possible values of k, which is an N-dimensional vector of versions of N pieces of software, where $N \geq 1$, the index $P_k$ is calculated by formulas $$P_k = \frac{I_k}{H}$$

$$I_k = -\log_{10}\frac{x_k}{n}$$

$$H = -\sum_i \frac{x_i}{n}\log_{10}\frac{x_i}{n}$$

$$n = \sum_i x_i$$

where $x_i$ is a number of instances of versions i, which is an N-dimensional vector, of the N pieces of software, and wherein the predetermined condition is that the total takes a least value.

11. The method as claimed in claim 7, further comprising:
- calculating, by the first computer, a correlation value between the current versions and the updated versions of the plurality of pieces of software included in a subset having two or more pieces of software amongst the plurality of pieces of software;
- extracting, by the first computer, the subsets having the correlation values greater than a predetermined threshold value; and
- grouping, by the first computer, the pieces of software included in one of the extracted subsets into a group to be treated as a single piece of software.

12. The method as claimed in claim 7, further comprising:
- calculating, by the first computer, a correlation value between the current versions and the updated versions of the plurality of pieces of software included in a subset having two or more pieces of software amongst the plurality of pieces of software;
- extracting, by the first computer, the subsets having the correlation values greater than a predetermined threshold value; and
- processing, by the first computer, the pieces of software included in one of the extracted subsets.

13. An information processing apparatus comprising:
- a memory configured to store a program; and
- a processor configured to execute the program and perform a process for determining an installation order in which a plurality of update programs corresponding to a plurality of respective pieces of software are to be installed in the processor to update current versions of the plurality of pieces of software to updated versions,
- wherein the process includes
- applying a function outputting an index representing a degree of likelihood that a version of a piece of software is installed in the processor, to information related to a plurality of pieces of software installed in a plurality of known computers, to calculate the index for each combination of current versions and updated versions of the plurality of pieces of software; and
- searching for the installation order satisfying a predetermined condition based on a total of the indices corresponding to possible combinations of the current versions and the updated versions when installing a plurality of update programs corresponding to the plurality of pieces of software one by one from a state in which the versions of all of the plurality of pieces of software are the current versions to a state in which the versions of all of the plurality of pieces of software are the updated versions.

14. The information processing apparatus as claimed in claim 13, wherein the applying includes
- obtaining the index by applying the function to each of the versions for each of the plurality of pieces of software, and
- calculating the index for each of the combinations by integrating the indices corresponding to the respective versions of the plurality of pieces of software included in the combination.

15. The information processing apparatus as claimed in claim 13, wherein the applying includes calculating the index for each of the combinations by applying the function to the combination.

16. The information processing apparatus as claimed in claim 13, wherein the function outputs an index $P_k$, which is a scalar value, for each of possible values of k, which is an N-dimensional vector of versions of N pieces of software, where N≥1, the index $P_k$ is calculated by formulas $$P_k = \frac{I_k}{H}$$

$$I_k = -\log_{10}\frac{x_k}{n}$$

$$H = -\sum_i \frac{x_i}{n}\log_{10}\frac{x_i}{n}$$

$$n = \sum_i x_i$$

where xi is a number of instances of versions i, which is an N-dimensional vector, of the N pieces of software, and wherein the predetermined condition is that the total takes a least value.

17. The information processing apparatus as claimed in claim 13, wherein the process further includes
calculating a correlation value between the current versions and the updated versions of the plurality of pieces of software included in a subset having two or more pieces of software amongst the plurality of pieces of software;
extracting the subsets having the correlation values greater than a predetermined threshold value, and
grouping the pieces of software included in one of the extracted subsets into a group to be treated as a single piece of software.

18. The information processing apparatus as claimed in claim 13, wherein the process further includes
calculating a correlation value between the current versions and the updated versions of the plurality of pieces of software included in a subset having two or more pieces of software amongst the plurality of pieces of software;
extracting the subsets having the correlation values greater than a predetermined threshold value, and
processing the pieces of software included in one of the extracted subsets.

* * * * *